Dec. 15, 1970     W. S. BINGER     3,547,492

PAVEMENT CUTTING APPARATUS

Filed April 16, 1969     3 Sheets-Sheet 1

INVENTOR.
Wynn S. Binger
BY
Merchant & Gould
ATTORNEYS

Dec. 15, 1970      W. S. BINGER      3,547,492
PAVEMENT CUTTING APPARATUS
Filed April 16, 1969      3 Sheets-Sheet 2
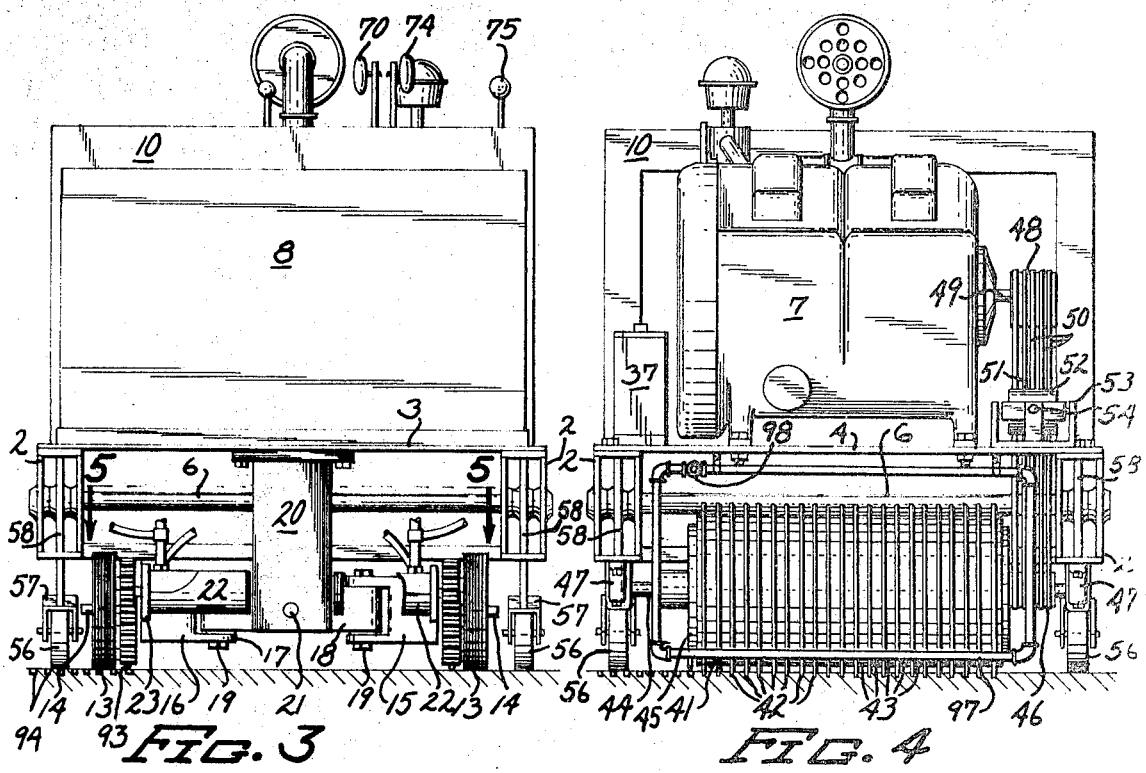
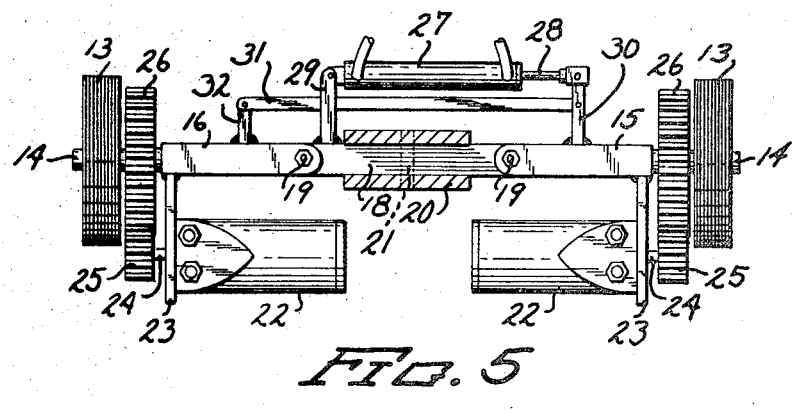
INVENTOR.
Wynn S. Binger
BY Merchant & Gould
ATTORNEYS Dec. 15, 1970
W. S. BINGER
3,547,492
PAVEMENT CUTTING APPARATUS
Filed April 16, 1969
3 Sheets-Sheet 3
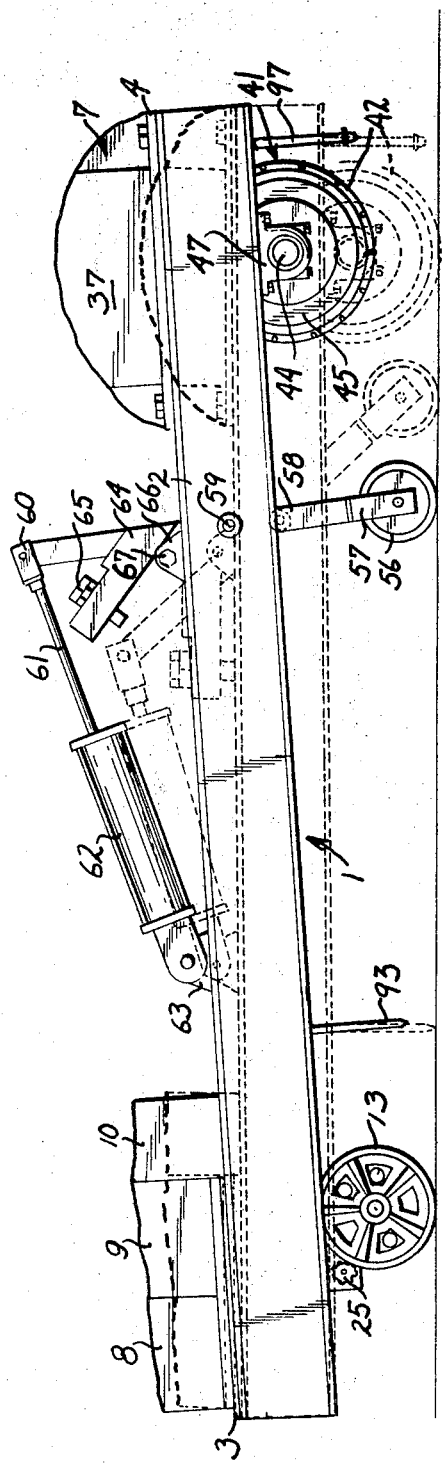
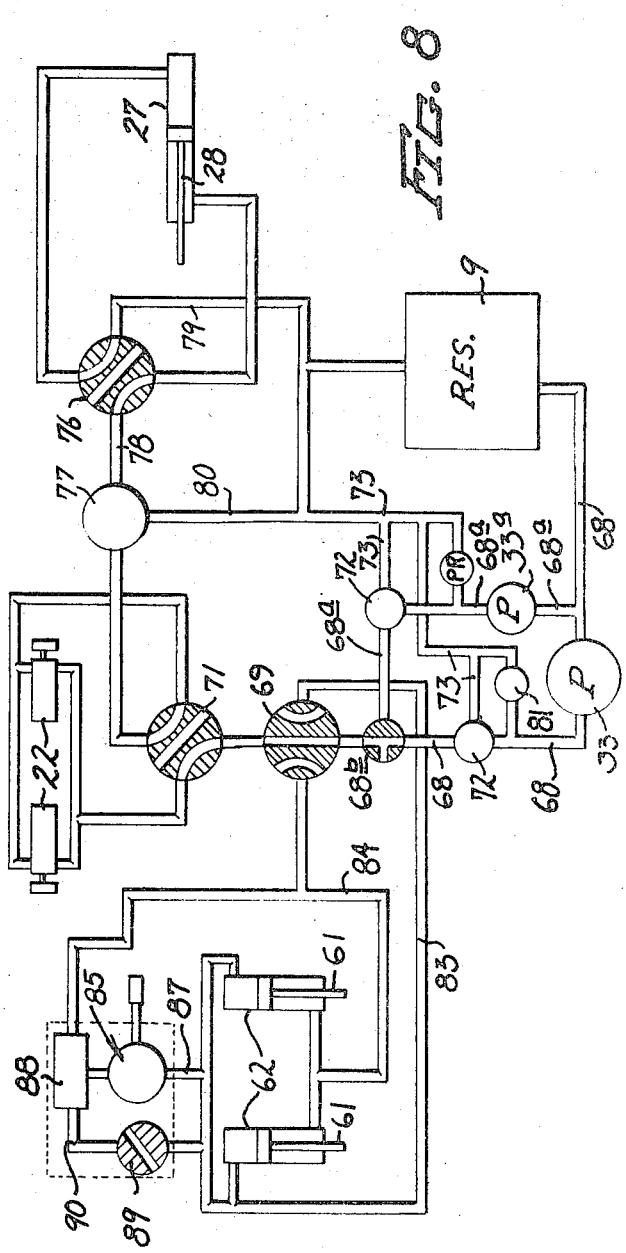
INVENTOR.
Wynn S. Binger
BY Merchant & Gould
ATTORNEYS

United States Patent Office 3,547,492
Patented Dec. 15, 1970

3,547,492
PAVEMENT CUTTING APPARATUS
Wynn S. Binger, Minneapolis, Minn., assignor to Construction Materials, Inc., Minneapolis, Minn., a corporation of Minnesota
Filed Apr. 16, 1969, Ser. No. 816,758
Int. Cl. E01c *23/09*
U.S. Cl. 299—39
10 Claims

ABSTRACT OF THE DISCLOSURE

Self-propelled apparatus including a frame having a cutting head at one end, a prime mover for rotating the cutting head, a pair of steerable driving wheels at the opposite end of the frame, and a pair of adjustable wheels disposed adjacent the cutting head and mounted for generally upward and downward movements relative to the frame and cutting head. Fluid pressure operated means, driven by a pump operatively connected to the prime mover, imparts driving rotation and steering movements to the driving wheels and raising and lowering movements to the adjustable wheels to raise and lower the cutting head and adjacent end of the frame relative to the ground.

BACKGROUND OF THE INVENTION

It is well known that the pneumatic tires of motor driven vehicles lose a substantial amount of traction on wet concrete pavement, and at higher cruising speeds, tend to plane or ride upon a film of water on the pavement, causing loss of control of a vehicle. It has been found that, by cutting into the top surface of the pavement to provide closely spaced longitudinal grooves therein, preferably in areas of the pavement where turns or curves are present, greatly improved adhesion of tires to the pavement is obtained.

SUMMARY OF THE INVENTION

An important object of this invention is the provision of a compact and efficient apparatus for cutting grooves in concrete or other hard pavement, having novel driving means and control mechanism for controlling the depth of grooves cut into the pavement. To these ends, I provide a generally rectangular horizontal frame having a prime mover on one end, a rotary pavement cutting head directly underlying the prime mover and driven thereby, a pair of steerable drive wheels supporting the opposite end of the frame, a pair of ground-engaging adjustable support wheels disposed adjacent the cutting head, and a pair of levers mounting the support wheels to the frame for upward and downward movement relative to the frame and cutting head. A fluid pump, driven by the prime mover, supplies fluid under pressure to a pair of fluid operated drive motors associated with the drive wheels, a fluid pressure steering cylinder for controlling the direction of steering movement of the drive wheels, and a pair of fluid pressure cylinders each associated with a different one of the levers to move the same in directions to raise and lower the cutting head and the adjacent end of the frame relative to the adjustable support wheels. Valves convenient to the operator control operation of the various motors and cylinders to drive and steer the apparatus and to raise and lower the cutting head. A secondary manually operated pump is used to supply fluid under pressure to the lever operating cylinders to raise the cutting head from engagement with the pavement in the event of failure of the prime mover.

DESCRIPTION OF THE DRAWINGS

FIG. 3 is a view in front elevation;
FIG. 4 is a view in rear elevation;
FIG. 5 is an enlarged fragmentary section taken substantially on the line 5—5 of FIG. 3;
FIG. 6 is an enlarged fragmentary view in side elevation as seen from the line 6—6 of FIG. 2;
FIG. 8 is a schematic fluid diagram.

DETAILED DESCRIPTION

Figure 1:
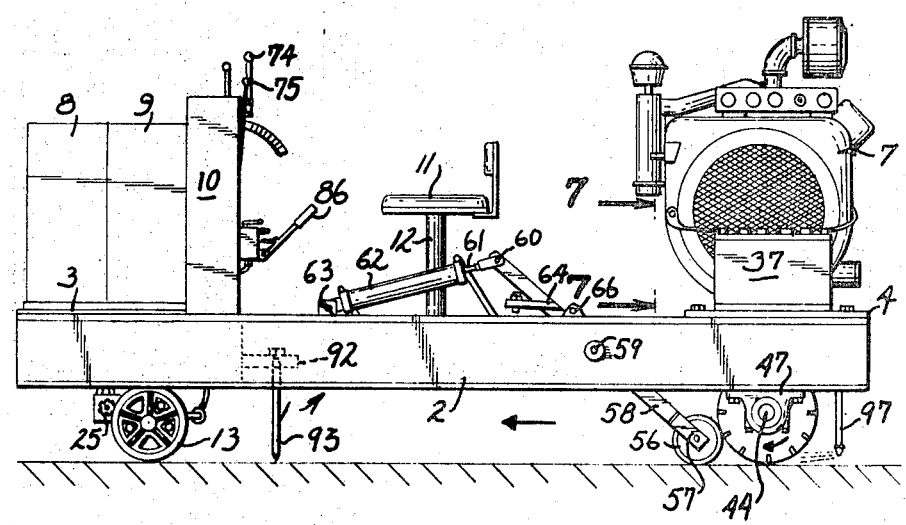
FIG. 1 is a view in side elevation of a pavement cutting apparatus produced in accordance with this invention.

In the preferred embodiment of the invention illustrated, the numeral 1 indicates, in its entirety, a generally rectangular frame comprising a pair of laterally spaced longitudinal side frame members 2, heavy plate-like front and rear cross frame members 3 and 4 respectively, an intermediate cross frame member 5, and a rigid tubular tie member 6 rearwardly of the cross frame member 5. The rear cross frame member 4 has rigidly mounted thereon a prime mover in the nature of an internal combustion engine 7, the front cross frame member 3 supporting a pair of generally rectangular reservoirs 8 and 9 for engine fuel and hydraulic fluid. A control console 10 extends transversely of the frame 1, and is suitably supported by the side frame members 2 directly behind the reservoirs 8 and 9. An operator's seat 11 is mounted on a pedestal 12 that is suitably mounted on and projects upwardly from the intermediate cross frame member 5. The front end of the frame 1 is supported by a pair of laterally spaced steerable drive wheels 13 that are suitably journalled on shafts 14 that project laterally outwardly from a pair of rigid arms 15 and 16 having bifurcated inner ends 17 pivotally mounted on a rigid mounting bar 18 by means of generally vertically disposed pivot bolts or the like 19. The mounting bar 18 is pivotally mounted intermediate its ends between a bifurcated mounting bracket 20 that is bolted to and depends from the plate-like cross frame member 3, by means of a pivot shaft 21 extending through the lower end portion of the mounting bracket 20 and intermediate portion of the mounting bar 18 on a generally horizontal axis extending longitudinally of the frame 1.

Figure 7:
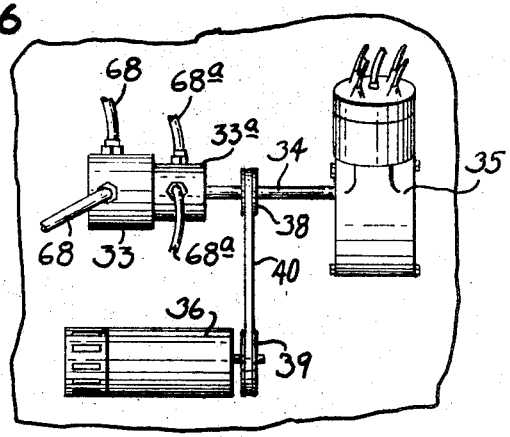
FIG. 7 is an enlarged fragmentary view in elevation, as seen from the line 7—7 of FIG. 1.

The drive wheels 13 are individually driven by a different one of a pair of rotary hydraulic motors 22 that are mounted on brackets 23 on the arms 15 and 16. Each motor 22 has a drive shaft 24 on which is mounted a drive pinion 25 that has meshing engagement with a gear 26 journalled on one of the shafts 14 and operatively connected to an adjacent one of the drive wheels 13, for common rotation therewith. Steering movement is imparted to the drive wheels 13 by a fluid pressure operated cylinder 27 and a cooperating piston rod 28, the cylinder 27 being pivotally connected at one end to a rigid arm portion 29 of the mounting bar 18, the piston rod 28 being pivotally connected to a rigid arm portion 30 of the bifurcated arm 15, see particularly FIG. 5. The arms 15 and 16 are interconnected for common steering movements by a rigid tie rod 31 pivotally connected at one end to the arm portion 30 and at its opposite end to a similar arm portion 32 on the bifurcated arm 16. Fluid, such as hydraulic liquid under pressure, is supplied to the motors 22 and cylinder 27 from a selected one of a pair of fluid pressure pumps 33 and 33*a*, suitably mounted on the engine 7, see FIG. 7, the pump 33 being of substantially higher volumetric capacity than the pump 33*a*. For the purpose of the present example, the pumps 33 and 33*a* are shown as being driven by a shaft 34 operated from the engine 7 through the usual distributor drive housing 35, the shaft 34 being normally used to drive the usual generator 36 normally utilized to charge the battery 37 associated with the engine 7. As shown in FIG. 7, the generator 36 is connected to the shaft 34 by pulleys 38 and 39 and an endless belt 40 entrained thereover. Operation of the motors 22 and cylinder 27 is controlled by control valve means, hereinafter to be described.

Figure 2:
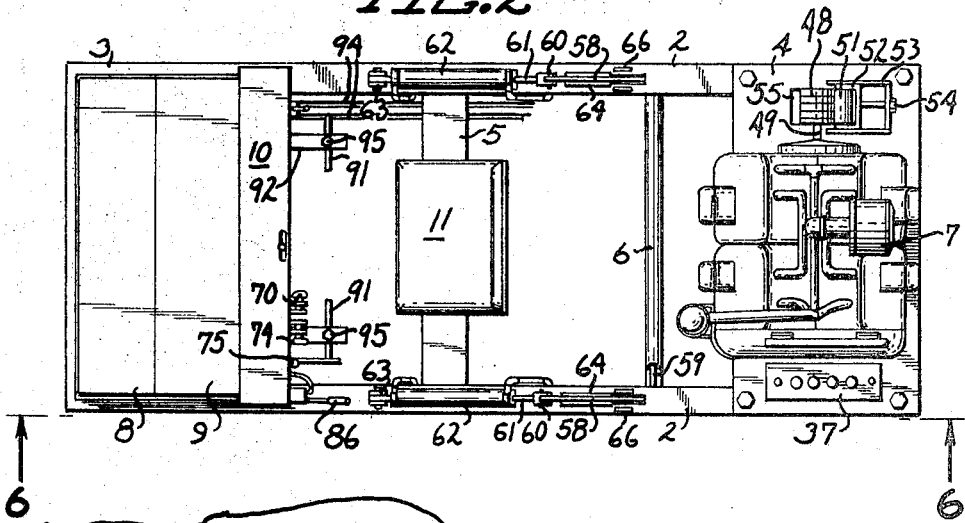
FIG. 2 is a view in top plan.

A rotary cutting head 41 extends transversely of the frame 1 directly below the engine 7, and comprises a plurality of axially spaced cutting disks 42 separated by spacer elements 43 and rigidly mounted on a supporting shaft 44, by means of a flanged stop collar 45 and a multi-groove pulley 46, the shaft 44 being journalled at its opposite ends in bearings 47 that are bolted or otherwise rigidly secured to the bottom surfaces of the box-like side frame members 2. Rotary motion is imparted to the cutting head 41 by the engine 7, a second multi-groove pulley 48 being rigidly mounted on the drive shaft 49 of the engine 7 and a plurality of drive belts 50 being entrained over the pulleys 46 and 48. Driving tension is maintained on the belts 50 by an idler pulley 51 having rolling engagement with the belts 50 between the upper and lower pulleys 48 and 46 respectively, the idler pulley 51 being journalled in a yoke 52 slidably mounted in a frame work 53 mounted on the plate-like rear frame member 4. Adjustment of the belt tension is made by an adjustment screw 54 screw threaded in the framework 53 and engaging the yoke 52. As shown in FIG. 2, the plate-like rear cross frame member 4 is formed to provide an opening 55 through which the drive belts 50 pass between the pullleys 46 and 48.

A pair of adjustable support wheels 56 disposed adjacent opposite ends of the cutting head 41 and slightly forwardly thereof, are journalled in the bifurcated lower ends 57 of a pair of levers 58 that extend generally upwardly through suitable openings in the side frame members 2 and which are journalled on a transverse shaft 59 mounted in the side frame members 2 and extending through the tubular tie member 6. The upper ends of the levers 58 are pivotally connected, as indicated at 60, to the outer ends of a pair of piston rods 61 operatively associated with respective fluid pressure operative cylinders 62 that are pivotally connected to mounting brackets 63 welded or otherwise rigidly mounted on the side frame members 2. As shown particularly in FIG. 6, the levers 58 are movable about the axis of the shaft 59 to impart generally vertical movement to the rear end portion of the frame 1, to move the cutting head 41 between a raised transport position shown by full lines in FIG. 6 and a lowered pavement cutting position shown by dotted lines in FIG. 6. The levers 58 are provided with lever arm portions 64 having lock nut equipped adjustment screws 65 screw threaded therein for engagement with the top surfaces of their adjacent side frame members 2, to adjustably limit downward movement of the cutting head 41, whereby to determine the depth of the grooves cut into the underlying pavement by the cutting disks 42. Each of the side frame members 2 is provided with a pair of laterally spaced upstanding lugs 66 having aligned openings therethrough for reception of bolts or pins 67 that engage adjacent sides of their respective levers 58 to positively lock the levers 58 in a frame and cutting head elevated position, see FIG. 6.

The drive motors 22, steering cylinder 27 and elevating cylinders 62, being operated by fluid pressure delivered thereto by a selected pump 33 or 33a are controlled by various valves mounted on the control console 10. Referring particularly to FIGS. 1, 2 and 8, it will be seen that the pumps 33 and 33a deliver fluid under pressure from the reservoir 9 through respective conduits 68 and 68a and a selector valve 68b to a primary control valve 69 operated by a control lever 70 which may be operated to selectively control the driving and elevating functions of the machine at relatively higher and lower speed ranges determined by the selector valve 68b. Operation of the drive motors 22 is controlled by a reversing valve 71 and metering valves 72, a return conduit 73 extending from the metering valves 72 to the reservoir 9. The reversing valve 71 is controlled by a valve operating lever 74, the metering valves 72 being controlled by a valve operating lever 75, the lever 75 being manipulated by the operator to control the speed of movement of the machine over the pavement. Operation of the steering cylinder 27 is dependent on operation of the drive motors 22, the steering cylinder 27 being controlled by a reversing valve 76 and a metering valve 77, the valve 77 being interposed in a conduit 78 extending between the valves 71 and 76. Return branch conduits 79 and 80 extend from the valves 76 and 77 respectively to the return conduit 73. It will be noted that, as the metering valves 72 control the speed of the drive motors 22 in both high and low speed ranges, the valves 72 indirectly control the speed of operation of the steering mechanism. The metering valve 77 is used to further control operation of the steering cylinder 27 within the limits of control of the valves 72, so that steering of the machine can be very closely controlled at creeping speeds, such as used when cutting grooves in pavement. The pump 33 is normally used when running the machine from one point of operation to another, the pump 33a being used to propel the machine at said creeping speeds. With further reference to FIG. 8, it will be seen that pressure relief valves 81 are interposed in pressure relief conduits 82 connected to the delivery side of the pumps 33 and 33a and to the return conduit 73.

The elevating cylinders 62 are connected to the primary control valve 69 by a pair of conduits 83 and 84 leading to opposite ends of the cylinders 62. The circuit arrangement is such that the rate of lifting and lowering movements of the piston rods 61 is controlled by the metering valve 72. The valve 69 is so arranged that it can be positioned to direct fluid to the drive motors 22 while hydraulically locking the cylinders 62 against movement. The pumps 33 and 33a, being driven by the engine 7, all of the fluid pressure operated devices become inoperative when the engine 7 is stopped. Thus, should the engine 7 cease to operate or die during the pavement cutting operation, re-starting of the engine is difficult until the cutting head 41 is raised from engagement with the pavement. For the purpose of raising the rear end portion of the frame 1 and parts carried thereby when the engine 7 is rendered inoperative, an auxiliary pump 85, mounted on the console 10 and manually operated by a lever 86, is connected in the lifting cylinder circuit by a branch conduit 87 connected between the conduit 83 and 84. The pump 85 is provided with a secondary reservoir 88 interposed in the conduit 87, and a control valve 89 is interposed in a by-pass conduit 90 between the reservoir 88 and the conduit 83. The valve 89 is used to maintain the reservoir 88 fully charged with fluid and is normally closed when the cylinders 62 are being operated by fluid from either pump 33 or 85. The valves 69, 71, 72, 76, 77, 81 and 89 are of well-known conventional structure, the valves 69 and 89 being normally closed, so that the motors 22 and cylinders 27 and 62 are normally inoperative.

During transport or storage, the rear end portion of the frame is raised, as shown by full lines in FIGS. 6, and the levers 58 are locked in their frame or cutting head raised position by the locking pins or bolts 67. With the engine 7 energized, the valves 68b and 69 are manipulated to direct fluid under pressure to the valves 71 and 76 for propelling the machine and enabling the same to be steered to the point of pavement cutting operation. During transport, the metering valves 72 and 68b are manipulated to drive the motors 22 at relatively higher speeds. At the point of cutting operation, the pins or bols 67 are removed and the valve 69 manipulated to cut off flow of fluid to the motors 22 and steering cylinder 27, and to introduce fluid under pressure to one end of each of the cylinders 62 to lower the rotating cutting head 41 into engagement with the pavement. When the cutting disks reach a predetermined cutting depth into the pavement, the stop screws 65 engage the adjacent side frame members 2 to limit downward movement of the cutting head 41, whereupon the control valves 68b and 69 are manipulated to again introduce fluid under pressure to the drive and steering system by the pump 33a. The metering valve 72 in the conduit 68a is adjusted to meter only such fluid to the motors 22 as will drive them at speeds in accordance with the cutting ability of the cutting disks 42. During such slow speed operation of the motors 22, fluid is directed at very slow speeds to the steering cylinder 27, so that steering of the vehicle is also very slow. Thus, during the pavement cutting or grooving operation, steering control of the machine is sufficiently slow to prevent the cutting disks 42 from binding in the grooves cut thereby in the pavement. Should the motors 22 be inadvertently accelerated so that an overload is placed on the cutting disks sufficient to stall the engine 7, the operator permits the primary control valve 69 to move to a closed position, and manipulates the pump lever 86 to impart cutting head raising movements to the piston rods 61 and levers 58 until the cutting disks 42 clear the pavement, after which the engine 7 can be re-started and the cutting head 41 lowered into cutting engagement with the pavement.

It will be noted, with reference to FIG. 2, that the frame 1 is of open construction, the pavement below the frame 1 being clearly visible to an operator on the seat 11. For the purpose of aiding the operator in properly guiding the machine, I provide a pair of aligning members 91 that are laterally adjustably mounted in brackets 92 projecting rearwardly from the lower portion of the control console 10. The aligning members 91 have downwardly extending legs 93 the lower end of either of which may be disposed just above ground level over a previously cut groove in the pavement, a previously cut group of grooves being indicated at 94. The aligning members 91 are held in adjusted set positions by suitable means, such as set screws or the like 95.

A coolant delivering pipe 96 extends traversely of the frame 1 rearwardly of the cutting head 41 and has its opposite ends connected to an inverted generally U-shaped conduit 97 having a fitting 98 for connection to a source of fluid under pressure, not shown. The pipe 96 is perforated to direct coolant liquid angularly forwardly and downwardly toward the bottom portion of the cutting head 41 so that, during cutting rotation of the head 41, the coolant liquid flows in the direction of such rotation and forwardly of the direction of movement of the machine, as shown by arrows in FIG. 1. With this arrangement, a person behind the machine can quickly and easily inspect the pavement directly behind the cutting head 41 to determine whether or not the machine is operating properly.

The relatively heavy weight of the engine 7 directly imposed over the cutting head 41, aids substantially in maintaining the cutting head in a stable condition when in operation, whereby to obtain grooves of uniform depth and direction.

What is claimed is:
1. Pavement cutting apparatus comprising:
 (a) a horizontal generally rectangular frame having front and rear ends;
 (b) a prime mover mounted on the frame adjacent one end thereof;
 (c) a rotary pavement cutting head journalled on the frame directly below said prime mover on a horizontal axis extending transversely of the frame and including a plurality of axially spaced cutting disks;
 (d) driving connections between said prime mover and the cutting head;
 (e) a fluid reservoir mounted adjacent the other end of said frame;
 (f) an operator's seat on said frame intermediate said prime mover and reservoir;
 (g) a pair of steerable drive wheels;
 (h) drive wheel mounting means mounting said drive wheels on the frame at said other end thereof;
 (i) fluid pressure operated means for imparting driving rotation and steering movements to said drive wheels;
 (j) a pair of ground-engaging adjustable support wheels;
 (k) means mounting said support wheels at opposite sides of said frame adjacent the cutting head for generally upward and downward movements relative to said frame and cutting head;
 (l) fluid pressure cylinder means and cooperating piston rod means operatively connected to said support wheels and to said frame;
 (m) and a fluid circuit including a pump operatively connected to said prime mover for delivery to said cylinder means and said fluid pressure operated means, and control valve means for controlling the flow of fluid under pressure to said cylinder means and fluid pressure operated means selectively.

2. The pavement cutting apparatus defined in claim 1 in which said drive wheel mounting means comprises a mounting bar extending transversely of said frame and pivotally connected intermediate its ends to said frame on a generally horizontal axis extending longitudinally of said frame, and a pair of rigid arms each journaling a different one of said drive wheels and each pivotally mounted on a different end of said mounting bar for generally forward and rearward steering movements on generally vertical axes.

3. The pavement cutting apparatus defined in claim 2, in which said fluid pressure operated means includes a pair of rotary fluid motors each mounted on a different one of said arms for common steering movements therewith and each drivingly connected to an adjacent one of said drive wheels.

4. The pavement cutting apparatus defined in claim 2 in which said fluid pressure operated means includes a fluid pressure cylinder and a cooperating piston rod extending generally transversely of said frame, one of said cylinder and piston rod being connected to said mounting bar and the other thereof being operatively connected to one of said arms, and a tie rod interconnecting said arms for common steering movements imparted thereto by said cylinder and piston rod.

5. The pavement cutting apparatus defined in claim 1 in which said means mounting the adjustable support wheels comprises a pair of levers pivotally mounted each to an opposite side of said frame on a generally horizontal axis extending transversely of the frame, said support wheels each being journaled on one end of said levers, said fluid pressure cylinder means comprising a pair of cylinders each having a piston rod movable axially thereof, one of each of said cylinders and piston rods being pivotally connected to one of said levers and the other of each thereof being pivotally connected to said frame.

6. The pavement cutting apparatus defined in claim 5, characterized by adjustable stop means on one of said frame and levers and engaging the other of said frame and levers to limit downward movement of said frame and cutting head relative to said support wheels.

7. The pavement cutting apparatus defined in claim 5, characterized by releasable locking means for positively holding said levers in their support wheel lowered positions independently of said cylinder and piston rod means to lock said cutting head in a raised position above ground level.

8. The pavement cutting apparatus defined in claim 5, characterized by a manually operated secondary pump for supplying fluid under pressure to said pair of cylinders in a direction to impart relative downward movement to said support wheels and relative raising movement to said cutting head independently of said first mentioned pump.

9. The pavement cutting apparatus defined in claim 1 in which said fluid pressure operated means includes a steering cylinder and a cooperating piston rod movable axially relative to said cylinder, said cylinder and piston rod being operatively connected to said frame and drive wheels, said control valve means including a steering valve controlling the direction of relative axial movement between said cylinder and piston rod, and a metering valve for controlling the speed of said relative axial movement.

10. The pavement cutting apparatus defined in claim 9 in which said fluid pressure operated means includes a pair of rotary fluid motors each drivingly connected to a different one of said drive wheels, said fluid circuit including fluid conduits connecting said pump, rotary fluid motors, and steering cylinder in a series circuit, said control valve means including reversing and metering valves interposed in said conduits for controlling direction and speed of rotation of said drive wheels, the arrangement being such that the speed of relative steering movement between said steering cylinder and its cooperating piston rod is at least partially controlled by the speed of rotation of said rotary fluid motors.

References Cited
UNITED STATES PATENTS

| | | | |
|---|---|---|---|
| 2,349,949 | 5/1944 | Farrell | 299—39 |
| 3,409,330 | 11/1968 | Hatcher et al. | 299—39 |

ERNEST R. PURSER, Primary Examiner